Nov. 13, 1928.

H. A. SELAH 1,691,255

CONDUIT FITTING

Filed Nov. 30, 1925

INVENTOR.
Howard A. Selah
BY
ATTORNEYS.

Patented Nov. 13, 1928.

1,691,255

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed November 30, 1925. Serial No. 72,181.

This invention is designed to improve conduit fittings, particularly such fittings as are adapted for use with threadless fittings. Such fittings are sometimes used in situations which require closures approximately, if not entirely, water tight and the present invention is designed to accomplish this purpose. Features and details of the invention will appear from the specification and claims.

The invention is illustrated in the accompanying drawings as follows:—

Figure 1:
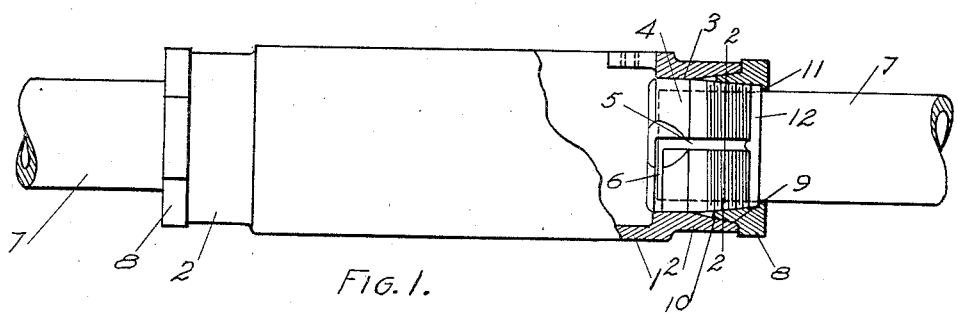

Fig. 1 shows a side elevation, partly in section.

Figure 2:
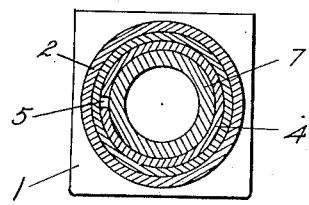

Fig. 2 a section on the line 2—2 in Fig. 1.

Figure 3:
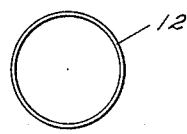

Fig. 3 an elevation of a gasket used in the construction.

1 marks the body of the fitting which as shown is in the form of a conduit box. This has an extension 2 with a tapered opening 3. A contractible sleeve 4 having walls conforming to the tapered opening 3 is arranged in the opening. This has a longitudinal slit 5 with a circumferential slit 6 extending therefrom.

The sleeve is adapted to receive and clamp a conduit 7.

A nut 8 is screwed on the end of the sleeve. This nut has a conical extension 9 which seats on a conical seat 10 on the outer end of the extension 2 making a sealed closure.

The nut has an internal flange 11 at its outer end and a gasket 12 is arranged within the nut between the flange 11 and the end of the sleeve.

As the nut is turned up to draw the sleeve into the opening 3 so as to compress it into clamping engagement with the conduit the end of the sleeve is drawn against the gasket 12 thus compressing it so that as it flows under compression it completely seals the joint formed between the nut and the conduit. Thus the completed article is completely sealed.

What I claim as new is:—

1. In a conduit fitting, the combination of a body having a conduit opening therein; a contractible sleeve in the opening having a longitudinal slit, the walls of the opening and the sleeve having wedging surfaces; a nut on the sleeve, said nut having an internal flange; and a gasket within the nut between the end of the sleeve and the flange, said nut forcing an axial movement of the sleeve to compress it and pressure on the gasket to form a seal on an inserted conduit, said fitting including means forming a seal between said nut and the walls of the conduit opening.

2. In a conduit fitting, the combination of a body having a conduit opening therein; a contractible sleeve in the opening having a longitudinal slit, the walls of the opening and the sleeve having wedging surfaces; a nut on the sleeve, said sleeve and nut forming a sealed closure through a surface joint with the walls of the body and having an internal flange; and a gasket within the nut between the end of the sleeve and the flange, said nut forcing an axial movement of the sleeve to compress it and pressure on the gasket to form a seal on an inserted conduit.

3. In a conduit fitting, the combination of a body having a conduit opening having a conical seat at one end of the opening; a contractible sleeve in the opening having a longitudinal slit, the walls of the opening and sleeve having wedging surfaces; a nut on the sleeve, said nut having a conical and seating portion engaging and seating on the seat in the opening and an internal flange; and a gasket within the nut between the end of the sleeve and the flange, said nut forcing an axial movement of the sleeve to compress it and pressure on the gasket to form a seal on an inserted conduit.

In testimony whereof I have hereunto set my hand.

HOWARD A. SELAH.